Jan. 14, 1936.  N. SKILLMAN  2,027,559
BUSHING
Filed Feb. 5, 1931
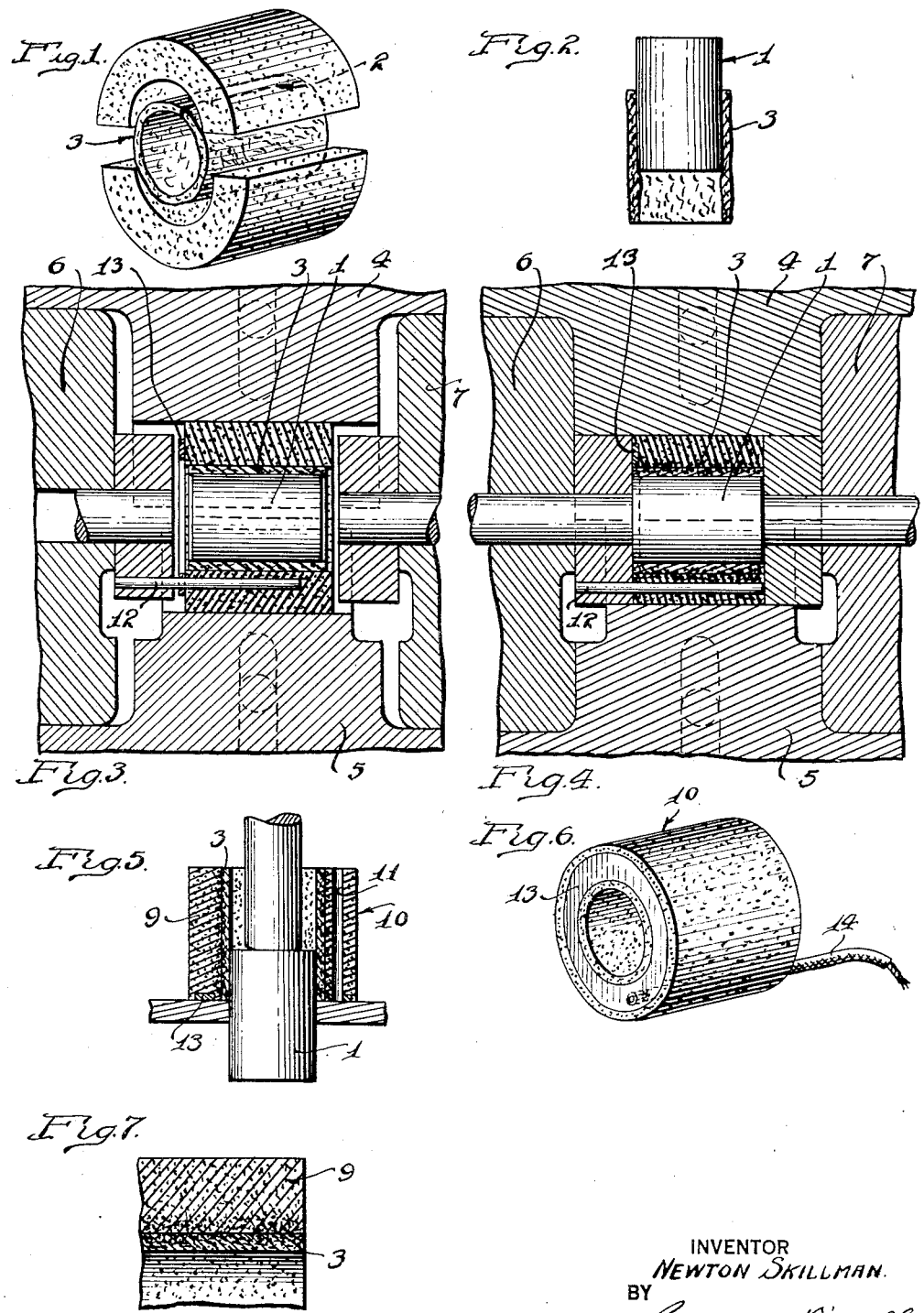
INVENTOR
*NEWTON SKILLMAN.*
BY
ATTORNEYS Patented Jan. 14, 1936

2,027,559

UNITED STATES PATENT OFFICE 2,027,559

BUSHING

Newton Skillman, Detroit, Mich., assignor to O. & S. Bearing Company, Detroit, Mich., a corporation of Michigan Application February 5, 1931, Serial No. 513,484

4 Claims. (Cl. 308—238)

This invention relates to a bushing, and has to do particularly with a novel, compact and simple self-lubricating bushing for use in steering columns and the like, and method of forming same.

The provision of an efficient bushing for steering columns has long been an important problem. In many cases the problem of assembly is a difficult one, in others, the bushing must be held to either one or two very accurate dimensions and, furthermore, the bushing must stand up under continued wear and prevent rattling. One type of bushing that has proven satisfactory for use in steering columns is that described in Patent No. 1,141,974 of June 8, 1915. While such bushings are comparatively inexpensive they require spinning or preforming of the lubricant impregnated fibrous lining so as to be correctly compressed and sized when fitted on a steering column or shaft of a certain size. Furthermore, while the metal sleeve is very easy to form, it does present limitations as to the size of tubing with which it can be used.

It is an object of the present invention to provide a bushing having an outer portion formed of initially plastic material allowed to harden and a lining of lubricant impregnated fibrous material carried and held to a predetermined dimension by the hardened outer material.

The hardened material forming the outer part of the bushing is novel in itself in that it acts as an insulator when used in steering column assemblies having a solid shaft and it also permits the bushing to be assembled without the necessity of reaming the housing. Standard tubing can be used for the outer housing of the steering column thus materially decreasing the overall cost of the steering column as a unit.

Another feature resides in the fact that the outer hardened material is such that the surface thereof will shear off during assembly and without in any way changing the inside diameter of the bushing.

Other features reside in the method of forming my novel bushing wherein the lubricant impregnated fibrous lining is first assembled on an arbor of predetermined diameter and the initially plastic material then positioned around the fibrous material, formed, and allowed to set; the plastic material having entered the interstices of the fibrous lining whereby when such plastic material is set it firmly holds the fibrous lining compressed and in final position; in other words, when the arbor is removed after the setting and cooling of the bushing the interior dimension of the lubricant impregnated fibrous lining is accurately predetermined and maintained. The necessity of spinning the lining to size is eliminated. Another feature of the method is that the entire bushing unit is formed in one operation.

Other features reside in details of construction of the bushing, particularly of the adaptation of the same to a solid shaft, and in details of the method of forming the same, as will be more clearly brought out in the specification and claims.

In the drawing:

Fig. 1 is a perspective, somewhat diagrammatic view, of the preferred manner of roughly preforming the plastic material prior to assembly around the fixedly positioned lining.

Fig. 2 illustrates the step of the method wherein the fibrous lining is stretched over the arbor.

Fig. 3 illustrates the step of assembling the plastic pellets around the fibrous material prior to compression and setting of this plastic material.

Fig. 4 is a view similar to Fig. 3, but showing the dies in closed position for giving the bushing its final finished shape in one operation.

Fig. 5 illustrates the step of removing the arbor to produce the finished bushing as shown in Fig. 6.

Fig. 6 illustrates a finished bushing.

Fig. 7 is a fragmentary enlarged sectional view taken through my finished bushing and illustrating the manner in which the plastic material impregnates and binds the fibrous lining.

In forming my bushing I preferably select an arbor 1 of predetermined diameter according to the size of bushing desired. A lining of woven fibrous material stitched together as at 2 to form an annular liner 3 is next stretched over the mandrel as indicated in Fig. 2. This liner 3 may be formed as described in my Patent No. 1,731,988 of October 15, 1929, or this fibrous material may be formed and impregnated with graphite in any other suitable manner.

The plastic material forming the main body of my bushing is preferably composed of a mixture of 60% gilsonite, 25% cotton linters and 15% clay. It will be understood, however, that different forms and percentages of plastic materials may be utilized, the essential feature being that the material is applied in plastic form and allowed to set or harden to form the finished bushing.

In the preferred manner of carrying out my invention the plastic material is first roughly formed into plastic pellets each pellet being formed of two halves, as best shown in Fig. 1. The plasticity of the pellets may obviously vary considerably and it will also be obvious that the temperature of plasticity may vary considerably according to the materials making up the plastic mass.

Any suitable dies may be utilized in forming the bushing and in Fig. 3 I have shown somewhat diagrammatically a set of water cooled dies consisting of upper and lower die members 4 and 5 and end die members 6 and 7.

One half of a preferably hot plastic pellet is placed in the corresponding cavity in the die, the arbor with the fabric fibrous lining then placed in position in the pellet half and the assembly completed by placing the top pellet of plastic material in place. The end dies 6 and 7 may or may not be brought together, depending upon the particular bushing being formed, but regardless of this the main die blocks 4 and 5 are brought together with the application of approximately one thousand pounds pressure per square inch. This pressure places the plastic material under compression and, in addition to placing the fibrous liner 3 under compression, the plastic material is such as to fill the interstices of the fibrous liner. The die blocks are preferably cooled and with the application of pressure and cooling the plastic material will quickly set or harden with the result that the plastic material flowing into the interstices of the fibrous lining will also harden and thus firmly join and permanently hold the fibrous liner in the position it assumes around the mandrel. Upon separation of the die blocks, the initially plastic material will be set as indicated at 9 to form a finished bushing 10. The mandrel 1 may be very easily removed from the bushing with the result that a bushing has been formed in one operation and whose inner layer is of fibrous material. Thus, while the inner liner 3 has been placed under compression during the formation of the bushing its inner dimensions determined by the mandrel 1 are positively determined and maintained by the hardened plastic material.

Where the shaft of the steering column is solid it is often desirable to have some form of electrical connection connected to or passing through the bushing. In order to take care of this problem I preferably form a small aperture 11 longitudinally of the bushing. This aperture may be formed by means of suitable plunger 12 forming a part of the die structure.

A metal ring 13 of conductive material may be positioned in place and pressed into one end of the bushing, as best illustrated in Figs. 3 and 4. The passageway 11 formed in the bushing preferably cooperates with a suitable aperture in this ring member 13. An electrical conduit 14 may then be passed through the passageway 11 and connected to the ring 13 by soldering or otherwise. It will thus be obvious that the metal ring 13 may be easily contacted with a horn button or other device forming a part of the steering column with the result that electrical connection can be easily made at the base of the steering column.

It will thus be obvious that any number of sizes or passageways may be formed in the wall of the bushing in addition to the opening defined by the fibrous liner. The heated plastic material will enter the portion of the fibrous liner, when placed under compression, as best illustrated in Fig. 7 and when such material sets it will positively hold the shape and dimensions as predetermined by the arbor 1.

I prefer to compress the plastic material radially but it will be obvious that it may be compressed under longitudinal pressure, the difficulty here being that there is some liability of the fibrous liner being pressed down or distorted when pressure is applied to compress the plastic material.

When my novel finished bushing is installed in position within the steering column or similar assembly the inner diameter of the liner is, of course, fixed so as to have a certain definite relation relative to the shaft; however, the outer diameter of the bushing may vary considerably as if the housing is rough or if too small the outer surface of the bushing will just shear off instead of cracking.

The material used in the outer portion of my bushing is particularly advantageous for use with steering columns in that it is waterproof and will not expand or crack under the action of moisture. The main ingredient for the heated plastic material used for the outer portion of my bushing is asphalt or an asphaltic compound. When set it is relatively non-frangible and will shear off relatively easily when inserted in the steering column housing. It is also of such solidity as to maintain the given diameter of the inner fibrous liner regardless of the pressure applied to the exterior of the bushing during and after assembly.

What I claim is:

1. A bushing comprising an inner liner of lubricant impregnated fibrous material integrally backed and held in place by a hardened asphaltic material, said material being of such consistency as to readily shear when forced into an undersize housing unit.

2. A bushing comprising a self-lubricating liner and a surrounding body of asphaltic material forming a spacer to complete the bushing unit, the material of said liner and body being mechanically interlocked to form an integral unit.

3. A bushing comprising a liner of lubricant impregnated fibrous material and an outer body of moldable material adapted to harden by cooling, said material being formed mainly of asphalt.

4. A steering column bushing comprising an inner liner of self-lubricating material, an outer body of asphaltic insulating material of the type adapted to harden by cooling, a contact ring positioned in one end of said outer body, and an electrical conductor connected to said ring and passing through said body of insulating material.

NEWTON SKILLMAN.